United States Patent
Labaj et al.

(10) Patent No.: US 9,535,575 B1
(45) Date of Patent: Jan. 3, 2017

(54) DYNAMICALLY-CONFIGURED DASHBOARD

(71) Applicant: EMC Corporation, Hopkinton, MA (US)

(72) Inventors: Donald E. Labaj, Northborough, MA (US); Scott E. Joyce, Foxboro, MA (US); Timothy Cox, Mendon, MA (US); Munish T. Desai, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 331 days.

(21) Appl. No.: 14/108,979

(22) Filed: Dec. 17, 2013

(51) Int. Cl.
| | |
|---|---|
| G06F 17/30 | (2006.01) |
| G06F 3/0482 | (2013.01) |
| G06F 11/34 | (2006.01) |
| H04L 12/26 | (2006.01) |
| H04L 12/721 | (2013.01) |

(52) U.S. Cl.
CPC ....... G06F 3/0482 (2013.01); G06F 17/30091 (2013.01); *G05B 2219/23247* (2013.01); *G06F 11/3447* (2013.01); *H04L 43/08* (2013.01); *H04L 45/123* (2013.01)

(58) Field of Classification Search
CPC .............. G05B 2219/23247; H04L 45/123; H04L 43/08; G06F 9/4443; G06F 3/0683; G06F 11/3447
See application file for complete search history.

(56) References Cited

U.S. PATENT DOCUMENTS

| | | | | |
|---|---|---|---|---|
| 8,464,180 | B1 * | 6/2013 | Kirkham | H04M 1/72586 715/765 |
| 8,595,636 | B2 * | 11/2013 | Bergman | G06F 3/048 707/999.104 |
| 8,701,042 | B2 * | 4/2014 | Kirkham | H04M 1/72586 715/765 |
| 9,152,308 | B2 * | 10/2015 | Kirkham | H04M 1/72586 |
| 9,286,413 | B1 * | 3/2016 | Coates | G06F 17/30572 |
| 2009/0150443 | A1 * | 6/2009 | Wiley | G06F 8/36 |
| 2012/0110480 | A1 * | 5/2012 | Kravets | G06F 17/30905 715/760 |
| 2012/0192075 | A1 * | 7/2012 | Ebtekar | H04L 12/6418 715/738 |

(Continued)

*Primary Examiner* — Shen Shiau
(74) *Attorney, Agent, or Firm* — BainwoodHuang

(57) ABSTRACT

Techniques are directed to a method of displaying data storage system widgets to a user within a graphical user interface of a data storage system management application running on a computing device. The method includes (a) during operation of the data storage system management application, repeatedly calculating, by the computing device, relevancy scores for a plurality of available data storage system widgets based on expected needs of the user, (b) during operation of the data storage system management application, repeatedly selecting, by the computing device, a set of widgets having the highest calculated relevancy scores from the plurality of available widgets, and (c) during operation of the data storage system management application, repeatedly displaying the selected set of widgets to the user on a display screen, the displayed widgets each presenting data storage system management data to the user. A computer program product and apparatus are also provided.

21 Claims, 4 Drawing Sheets

(56) References Cited

U.S. PATENT DOCUMENTS

| | | | |
|---|---|---|---|
| 2013/0339901 A1* | 12/2013 | Kirkham | H04M 1/72586 715/810 |
| 2014/0223353 A1* | 8/2014 | Kirkham | H04M 1/72586 715/771 |
| 2016/0112294 A1* | 4/2016 | Annamalai | H04L 43/16 715/736 |

* cited by examiner

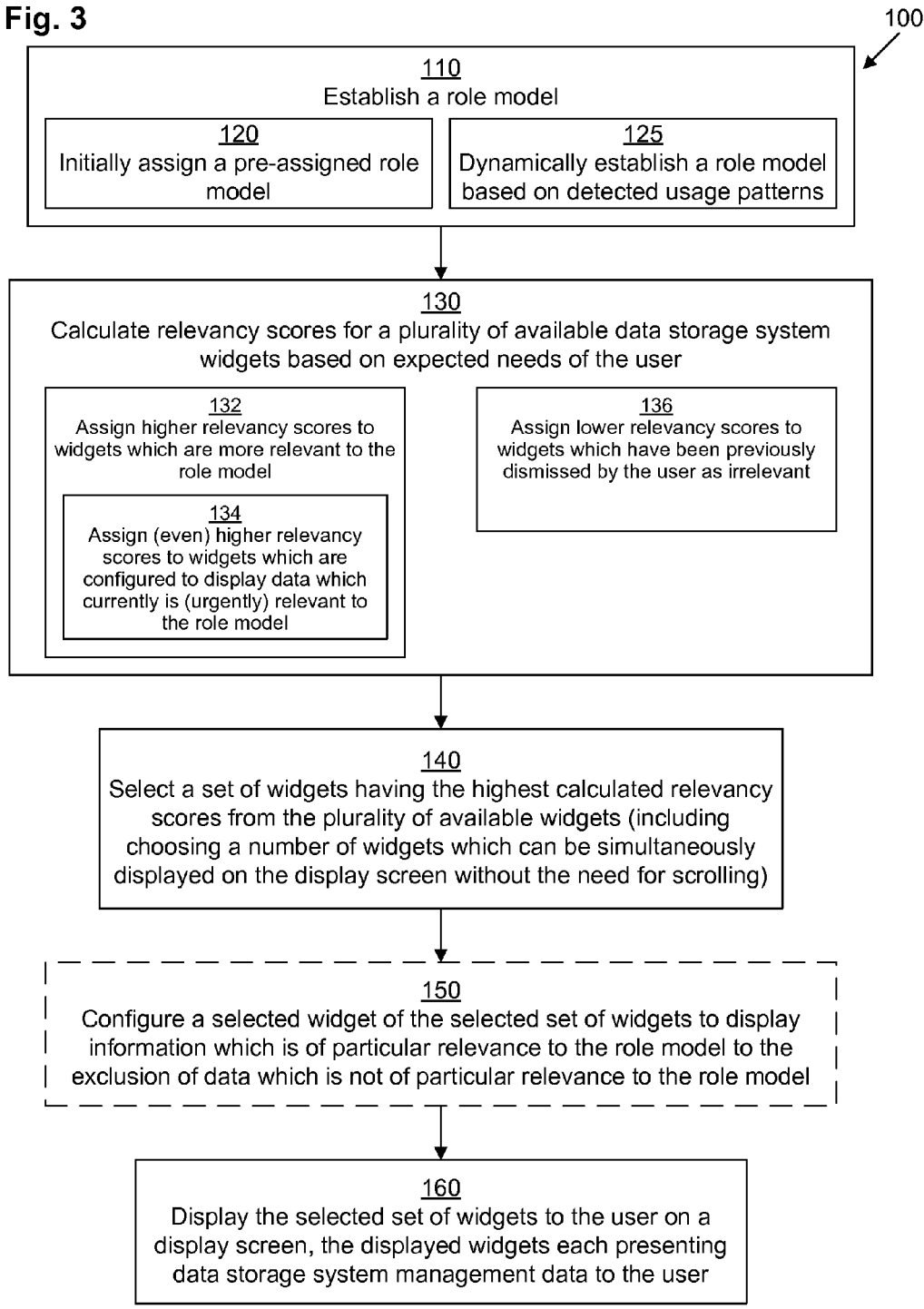

DYNAMICALLY-CONFIGURED DASHBOARD

BACKGROUND

Data storage systems are used to store large quantities of data in a fast and integrated manner. Data storage systems are often configured to provide a management interface to a user, such as a storage administrator, operating a management console or a management application running on a computer in network communication with the data storage system. The management application allows the user to view information about the configuration and operation of the data storage system.

SUMMARY

Unfortunately, the above-described management applications may suffer from deficiencies. For example, a user may wish to view several different visualizations of information about the configuration and operation of the data storage system at once, and in particular to view the most relevant visualizations. In some management applications, a dashboard module may allow a user to configure several widgets to display information about several different aspects of the data storage system at the same time. However, the dashboard configuration is static. Thus, either the widgets may be pre-installed on the dashboard, or the user may be able to install specific widgets onto the dashboard with respect to particular visualizations of information about the configuration and operation of the data storage system that he wishes to see.

However, there may be too many available visualizations of information about the configuration and operation of the data storage system that the user may wish to see at various times to fit on the dashboard at once; the user will not be able to see all of the widgets that he wants to have access to unless he repeatedly reconfigures the dashboard or toggles between several different dashboards. In addition, if an aspect of the data storage system requiring immediate attention of the user is not currently displayed on a widget of the current dashboard, then there may be a delay in the user being made aware of the information until the user toggles or reconfigures the dashboard to display an appropriate widget.

In order to alleviate these problems, it would be desirable for a dashboard to be configurable in a dynamic way. In contrast to the above-described approaches, improved techniques are described for implementing a dashboard for a data storage system that is dynamically configured to display a set of widgets that, at any given time, is most relevant to the user.

One embodiment of the improved techniques is directed to a method of displaying data storage system widgets to a user within a graphical user interface of a data storage system management application running on a computing device. The method includes (a) during operation of the data storage system management application, repeatedly calculating, by the computing device, relevancy scores for a plurality of available data storage system widgets based on expected needs of the user, (b) during operation of the data storage system management application, repeatedly selecting, by the computing device, a set of widgets having the highest calculated relevancy scores from the plurality of available widgets, and (c) during operation of the data storage system management application, repeatedly displaying the selected set of widgets to the user on a display screen, the displayed widgets each presenting data storage system management data to the user. Other embodiments are directed to a computerized apparatus and computer program products for performing methods similar to that described above. These embodiments are beneficial in that they allow a dashboard to be configurable in a dynamic way, permitting the user to see the most relevant information on the screen at once.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example method according to various embodiments.

DETAILED DESCRIPTION

Embodiments are directed to techniques for implementing a dashboard for a data storage system that is dynamically configured to display a set of widgets that, at any given time, is most relevant to the user.

Figure 1:
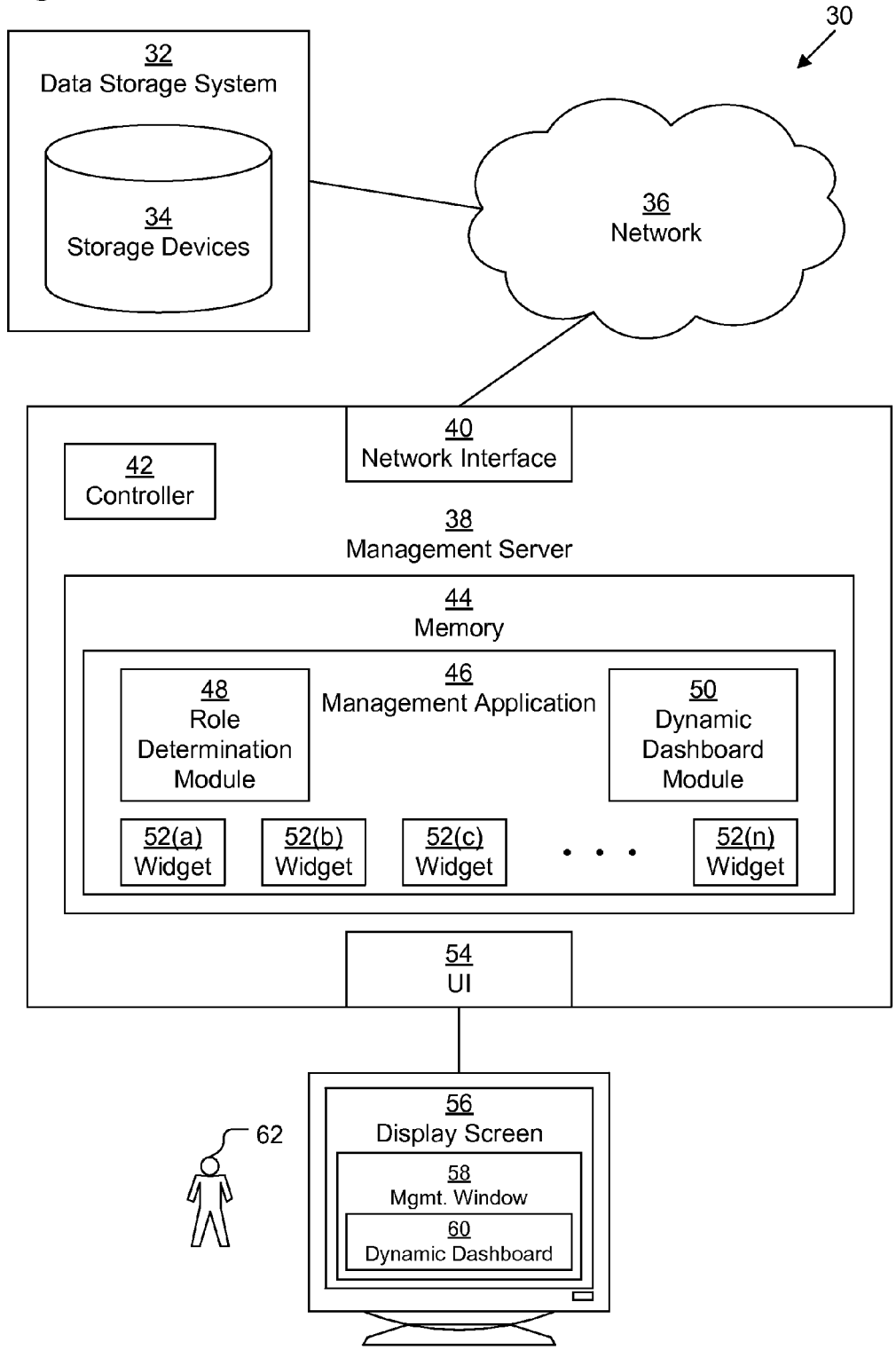
FIG. 1 depicts an example system for use in performing various embodiments.

FIG. 1 depicts an example data storage environment 30. Environment 30 includes a data storage system 32 that stores data on a set of storage devices 34. Data storage system 32 may be, for example, one or more high performance data storage arrays, such as, for example a VNXe Series data storage system produced by the EMC Corp. of Hopkinton, Mass. In general, data storage system 32 may be any kind of computing device or set of computing devices configured to provide access to data stored on storage devices 34.

Data storage system 32 connects to network 36. Network 36 may be any kind of data communication network, such as for example the Internet, a local area network, a wide area network, a storage area network, a virtual private network, a cellular data network, a wireless local area network, an interconnected fabric of connections and switches, similar systems, and combinations thereof.

Environment 30 also includes a management server 38 which connects to the network 36 via network interface 40. Management server 38 is a computing device, such as, for example, a personal computer, a workstation computer, a server computer, an enterprise server computer, a cellular phone, a smart phone, a tablet, a laptop computer, etc. Network interface 40 may include an Ethernet card, a cellular modem, a Wireless Fidelity (WiFi) wireless networking adapter, any other device for connecting to a network, or some combination thereof.

Management server 38 includes a processor 42, memory 44, and, in some embodiments, user interface (UI) circuitry 54 for displaying a management window 58 of a management application 46 on display screen 56 to a user 62. In other embodiments (not depicted), the display screen 56 may instead be connected to another computing device on network 36 (or, in some embodiments, another network), the other computing device running a web browser in communication with the management application 46 of the management server 38.

As depicted, UI 54 allows the management server 38 to interact with user 62 by displaying management window 58 as part of a graphical user interface (GUI) to the user 62 on display screen 56 (as well as various other GUI elements) and to receive instructions from the user 62 via a connected input device (not depicted). Display screen 56 may be any kind of display device capable of displaying a GUI, such as, for example, a cathode ray tube, a liquid crystal display, a projection device, a plasma display, or a similar device as is well-known in the art. Display screen 56 may also include more than one display device, each of which may use the same or different display technologies. The input device may be one or more of any kind of user input devices such as, for example, a keyboard, a keypad, a mouse, a trackpad, a tracking ball, a pen-based digitizer, a stylus-based digitzer, or a similar device as is well-known in the art. In some embodiments, display screen 56 and the user input device may be combined into a single device, such as, for example, a touch-sensitive display screen. UI circuitry 54 may include one or more of a graphics adapter, a touch-based input controller, a mouse interface, a keyboard interface, a universal serial bus, or other similar devices.

Processor 42 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 44 may be any kind of digital system memory, such as, for example, random access memory (RAM). Memory 40 stores an operating system program (e.g., Linux, UNIX, Windows, or a similar operating system) and applications executing on processor 42 as well as data used by those programs.

Memory 44 may include both a system memory portion for storing programs and data in active use by the processor 42 as well as a persistent storage portion (e.g., solid-state storage and/or disk-based storage) for storing programs and data (not depicted) even while the management server 38 is powered off. The operating system (not depicted) and the applications are typically stored both in system memory and in persistent storage so that they may be loaded into system memory from persistent storage upon a system restart. Applications, when stored in non-transitory form either in system memory or in persistent storage, form a computer program product. The processor 42 running one or more of these applications thus forms a specialized circuit constructed and arranged to carry out the various processes described herein.

Memory 44 stores the management application 46 as it runs on processor 42. Management application 46 presents information about the operation of the data storage system 32 to the user 62 and allows the user 62 to configure and control the operation of the data storage system 32 via management window 58. One aspect of the management window 58 provided by the management application 46 is dynamic dashboard 60, which is controlled by a dynamic dashboard module 50 of the management application 46. Dynamic dashboard 60 is a panel of the management window 58 which displays various widgets to the user 62. A widget is a small, self contained visual software component that displays various data to the user 62. The widgets displayed within the dynamic dashboard 60 vary dynamically over time and are selected from a set of available widgets 52 (depicted as available widgets 52(a), 52(b), 52(c), . . . , 52(n)) installed on the management server 38 into memory 44. Each widget 52 has a defined functionality for displaying a particular kind of information about the data storage system 32 to the user 62 according to a particular style of visualization. For example, one available widget 52 may be an alert widget configured to display a list of system alerts related to exceptions and errors generated by the data storage system 32. Another available widget 52 may include a list of a plurality of data storage arrays that make up the data storage system 32 and their respective model numbers and network addresses. Another available widget 52 may include a list of the plurality of storage devices 34 installed within the data storage system 32 as well as a respective serial number and free/used capacity for each storage device 34. Another available widget 52 may include a bar graph depicting both the free and used capacity of each of a plurality of storage arrays of the data storage system 32.

Management application 46 may also include a role determination module 48, which is configured to assign a role to the user 62. The role determination module 48 may initially determine the role of the user 62 based on a role initially-assigned to the user by a system administrator, but, typically, as the user 62 continues to operate the management application 46, role determination module 48 continually adjusts the role base on actions that the user 62 has performed in the context of operation of management application 46. The dynamic dashboard module 50 is then able to repeatedly determine which of the available widgets 52 to display within dynamic dashboard 60 based on the role assigned by the role determination module 48 as well as other operating conditions, as described below in further detail.

It should be understood that although management window 58 is depicted as displaying the dynamic dashboard 60, management window 58 is also capable of displaying other management panels aside from the dynamic dashboard 60. Thus, for example, management window 58 may instead, at a particular time during operation, display a configuration manager, allowing the user 62 to configure various elements of the data storage system 32.

Figure 2A:
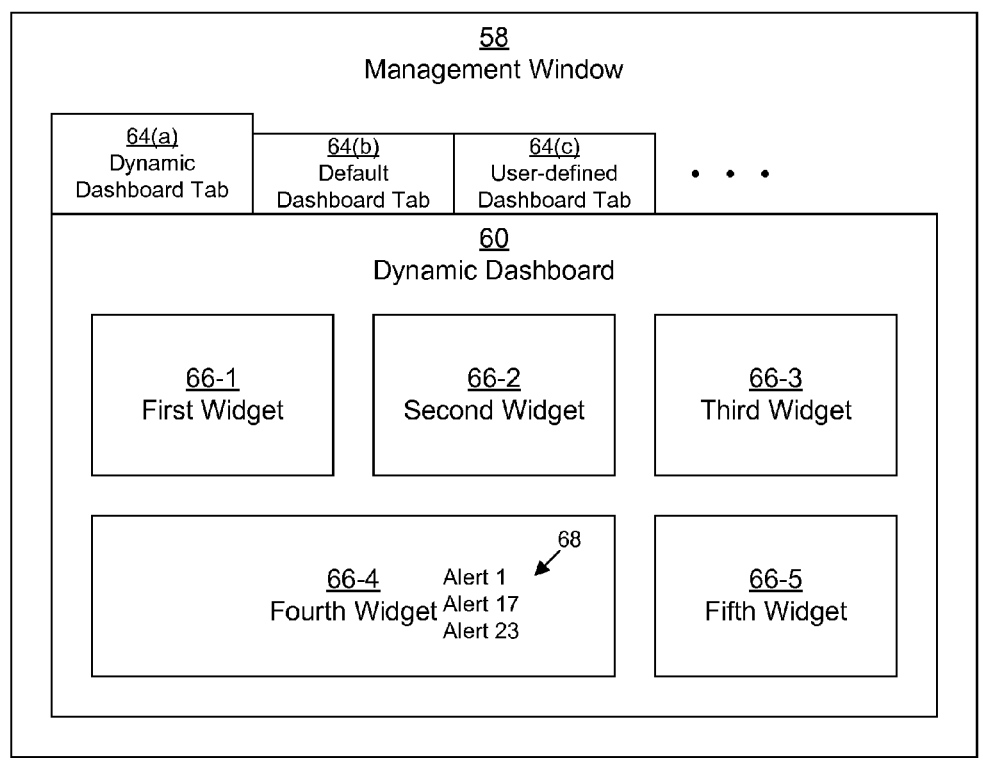
FIG. 2A depicts an example management application window, including a dynamic dashboard, for use in performing various embodiments.

FIG. 2A depicts an example management window 58 displayed on display screen 56. Management window 56 includes dynamic dashboard 60. In some embodiments (as depicted), the user has the option to toggle between the dynamic dashboard 60 and other non-dynamic dashboards by selecting the dynamic dashboard tab 64(a) instead of another tab 64(b), 64(c). Dynamic dashboard 60 includes a set of displayed widgets 66 in particular locations within the dynamic dashboard 60. As depicted the dynamic dashboard 60 includes a first widget 66-1, a second widget 66-2, and a third widget 66-3 in a first row, all the same size, and an oversized fourth widget 66-4 and a fifth widget 66-5 in a second row. As depicted, oversized fourth widget 66-4 is an alert widget, which displays a set of alerts 68. Because only certain alerts may be relevant to the user 62, fourth widget 66-4 has been configured to only display the set of alerts 68 that are relevant to the user 62. In the depicted example, only alerts numbered 1, 17, and 23 are displayed because, for example, at the time depicted in FIG. 2A, only those alerts are relevant to the user 62. For example, if the user 62 is a performance analyst, alerts 1, 17, and 23 may be performance alerts related to slow performance of storage devices 34 of the data storage system 32, while other alerts not displayed within fourth widget 66-4 relate to other aspects of the data storage system 32, such as, for example, alerts 2 and 7 relating to free space on certain of the storage devices 34 running dangerously low.

Selection of default dashboard tab 64(*b*) replaces the dynamic dashboard 60 with a default dashboard (not depicted), which includes a fixed set of displayed widgets 66 according to a default arrangement. Selection of user-defined dashboard tab 64(*c*) replaces the dynamic dashboard 60 with a user-defined dashboard (not depicted), which includes a set of displayed widgets 66 that the user 62 has previously explicitly selected. Additional dashboard tabs 64 may also exist to allow the user 62 to select additional dashboards.

Figure 2B:
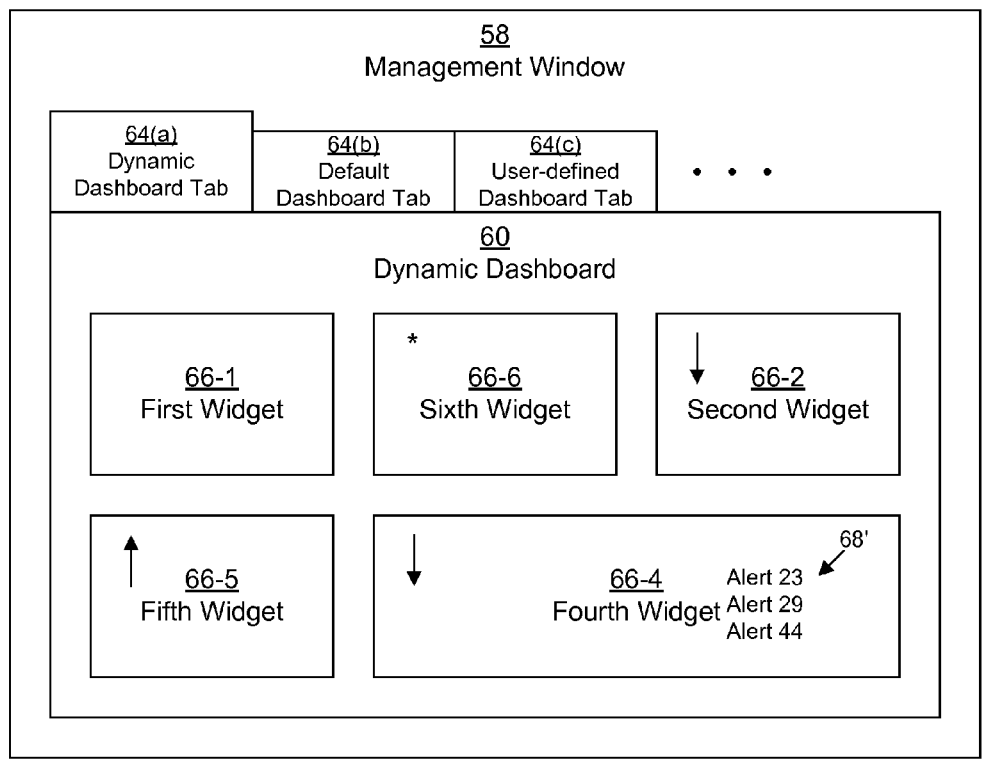
FIG. 2B depicts an example management application window, including a dynamic dashboard, for use in performing various embodiments.

FIG. 2B depicts example management window 58 displayed on display screen 56 at another point in time. Management window 56 includes dynamic dashboard 60 panel, which includes a different set of displayed widgets 66 in a different arrangement based on a change of relevancy to the user 62 at the different time. At this different point in time, sixth widget 66-6 has been added (indicated as being new by the * character) as it is now more relevant than the third widget 66-3 which has been dropped from the dynamic dashboard 60. In addition, second and fourth widgets 66-2, 66-4 have been demoted to a lower position (indicated as being demoted by the downward-facing arrows), while fifth widget 66-5 has been promoted to a higher relevancy (indicated as being promoted by the upward-facing arrow). In addition, at this point in time, fourth widget may display an updated set of alerts 68'. For example, alerts 1 and 17 may no longer be relevant (e.g., because corrective action has already been taken), while new alerts 29 and 44 may have been added.

In some embodiments, visual signals of new, demoted, and promoted widgets 66 may be displayed upon the displayed widgets 66 moving. Thus, for example, the * character may represent that the sixth widget 66-6 is flashing, while the downward-facing arrows may represent that the second and fourth widgets 66-2, 66-4 have slid down into place or that they may depict a downward-oriented wave of color superimposed thereon or another similar representation. Similarly, the upward-facing arrows may represent that the fifth widget 66-5 has slid up into place or that it may depict a downward-oriented wave of color superimposed thereon or another similar representation.

FIG. 3 depicts an example method 100 performed by management server 32 for implementing dynamic dashboard 60 for data storage system 32, the dynamic dashboard 60 being dynamically-configured to display a set of widgets 66 that, at any given time, is most relevant to the user 62.

It should be understood that any time a piece of software, such as, for example, management application 46, role determination module 48, or dynamic dashboard module 50, is described as performing a method, process, step, or function, in actuality what is meant is that a computing device (e.g., management server 38) on which that piece of software is running performs the method, process, step, or function when executing that piece of software on its controller (e.g., processor 42).

In step 110, role determination module 48 establishes a role model or a set of role models to model the user 62. In some embodiments, user 62 is initially assigned, in sub-step 120, to a pre-assigned role model or a set of role models. For example, user 62 may be initially assigned to be a system administrator. In another example, user 62 may be assigned to be a combination of 40% performance analyst and 60% storage administrator.

Once the user 62 has run the management application 38 several times, however, it may turn out that the user 62 performs activities that are not consistent with the actions typical of the role model(s). Thus, in sub-step 125, once enough data has been collected on the actions of the user 62, role determination module 48 dynamically establishes which role model(s) the user 62 most closely resembles based on activities previously performed by the user 62 in the management of the data storage system 32 via the management application 46. Thus, for example, if the user 62 has recently configured many new disks within data storage system 32 and altered the settings on a few previously-installed disks that were under-performing, role determination module 48 might assign the user to be 20% performance analyst and 80% storage administrator. In some embodiments, role determination module 48 utilizes artificial intelligence algorithms (e.g., neural networks, Bayesian networks, machine learning, and other techniques well-known in the art of artificial intelligence) to perform sub-step 125.

In step 130, dynamic dashboard module 50 calculates relevancy scores for a plurality of available widgets 52 based on expected needs of the user 62. In some embodiments, dynamic dashboard module 50 utilizes artificial intelligence algorithms (e.g., neural networks, Bayesian networks, machine learning, and other techniques well-known in the art of artificial intelligence) to perform step 130.

In some embodiments, as depicted in sub-step 132, dynamic dashboard module 50 performs this calculation based on the assigned role model(s) to which the user 62 has been assigned in step 110, although in other embodiments, other techniques may be used to perform this calculation without the use of any role model. In sub-step 132, dynamic dashboard module 50 assigns relatively higher relevancy scores to widgets 52 which are more relevant to the role model(s) and relatively lower relevancy scores to widgets 52 which are less relevant to the role model(s). In sub-step 134, dynamic dashboard module 50 assigns relatively higher relevancy scores to widgets 52 which are configured to display data which currently is relevant to the role model(s) and relatively lower relevancy scores to widgets 52 which are configured to display data which currently is not relevant to the role model(s). For example, if fourth widget 66-4 currently has no alerts 68 of interest to a storage administrator and none of interest to a performance analyst, then in the 20%/80% example described above, fourth widget 66-4 would be assigned a low relevancy score.

In some embodiments, sub-step 134 may be further configured to take urgency into account in calculating the relevancy scores. Thus, widgets 52 which are configured to display data which currently is urgently relevant to the role model(s) receive even higher scores than widgets 52 which are configured to display data which currently is relevant to the role model(s) in a non-urgent manner. Thus, for example, in the 20%/80% example described above, if fourth widget 66-4 currently has one alert 68 of urgent interest to a storage administrator and no alerts of interest to a performance analyst, fourth widget 66-4 may be assigned a relatively high relevancy score, while if fourth widget 66-4 currently has no alerts 68 of urgent interest to a storage administrator and one alert of limited interest to a performance analyst, fourth widget 66-4 may be assigned a relatively low relevancy score.

In some embodiments, step 130 may include sub-step 136. In such embodiments, dynamic dashboard 60 may include a control (not depicted) which allows the user 62 to dismiss a particular displayed widget 66 as irrelevant. Thus, in sub-step 136, dynamic dashboard module 50 assigns relatively higher relevancy scores to widgets 52 which have not been recently dismissed often and relatively lower relevancy scores to widgets 52 which have recently been dismissed often.

In step 140, dynamic dashboard module 50 selects a set of widgets 66 having the highest calculated relevancy scores from among the available widgets 52. In some embodiments, since the dynamic dashboard 60 only has a limited size on the display screen 56 and the widgets 66 may have a fixed size, only a certain number of widgets 66 may fit within the dynamic dashboard 60 at once. This may be the case in embodiments in which scrolling is not permitted within the dynamic dashboard 60 (in order to allow all of the most important widgets 66 to be viewable at the same time on the dynamic dashboard). Thus, if there is room for five widgets 66 on the dynamic dashboard 60, dynamic dashboard module 50 will typically select the five widgets 66 having the highest relevancy scores from amongst the available widgets 52. In some embodiments, when different widgets 66 have different display sizes (e.g., fourth widget 66-4 is larger than the other widgets 66), the number and selection of widgets 66 may depend on the relative sizes of the highest scoring of the available widgets 52.

In some embodiments, step 150 may follow step 140. In optional step 150, dynamic dashboard module 50 configures a selected widget 66 to display information which is of particular relevance to the assigned role model(s) to the exclusion of data which is not of particular relevance to the assigned role model(s). Thus, fourth widget 66-4 may contain twenty-five alerts 68 (alerts 1-25, not all depicted), but since only alerts 1, 17, and 23 are relevant to the user, dynamic dashboard module 50, in step 150, configures fourth widget 66-4 to only display alerts 1, 17, and 23 to the exclusion of the remaining alerts which are not relevant.

Finally, in step 160, dynamic dashboard module 50 causes the selected set of widgets 66 to be displayed to the user 62 on the display screen 56 on dynamic dashboard 60 panel of management window 58.

It should be understood that method 100 loops continuously, for example, repeating every 5 seconds. Thus, at time X, dynamic dashboard 60 may appear as in FIG. 2A, but at time X+5 seconds, dynamic dashboard 60 may appear as in FIG. 2B due to a change in the relative relevancies of the various available widgets. When the selected widgets 66 displayed within dynamic dashboard 60 change, there may be a visual queue which makes it conspicuous that there has been a change. Thus, in some embodiments, widgets 66 may be configured to slide in and out of position. In some embodiments, newly positioned or newly-added widgets may be configured to flash for a period of time, while in other embodiments, only widgets 66 which have been promoted in position may be configured to flash.

Thus, techniques have been described for implementing a dynamic dashboard 60 for a data storage system 32 that is dynamically configured to display a set of widgets 66 that, at any given time, is most relevant to the user 62.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of automatically displaying data storage system widgets to a user within a graphical user interface of a data storage system management application running on a computing device, the method comprising:

during operation of the data storage system management application, repeatedly calculating, by the computing device, relevancy scores for a plurality of available data storage system widgets based on expected needs of the user;

during operation of the data storage system management application, repeatedly selecting, by the computing device, a set of widgets having highest calculated relevancy scores from the plurality of available widgets; and during operation of the data storage system management application, repeatedly displaying the selected set of widgets to the user on a display screen, the displayed widgets each presenting data storage system management data to the user.

2. The method of claim 1 wherein:

the method further includes, during operation of the data storage system management application, dynamically:

detecting patterns of activity performed by the user; and associating the user with a role model correlated with the detected patterns of activity; and calculating includes assigning relatively higher relevancy scores to widgets which are more relevant to the role model and relatively lower relevancy scores to widgets which are less relevant to the role model.

3. The method of claim 2 wherein calculating further includes assigning relatively higher relevancy scores to widgets which are configured to display data which currently is more relevant to the role model and relatively lower relevancy scores to widgets which are configured to display data which currently is less relevant to the role model.

4. The method of claim 3 wherein assigning relatively higher relevancy scores to widgets which are configured to display data which currently is more relevant to the role model includes assigning even higher relevancy scores to widgets which are configured to display data which currently is urgently relevant to the role model.

5. The method of claim 2 wherein the method further includes configuring a selected widget of the selected set of widgets to display information which is of particular relevance to the role model without displaying data which is not of particular relevance to the role model.

6. The method of claim 2 wherein associating the user with a role model correlated with the detected patterns of activity is performed using artificial intelligence techniques.

7. The method of claim 2 wherein the method further includes configuring a selected widget of the selected set of widgets to display alerts which are of particular relevance to the role model without displaying other alerts which are not of particular relevance to the role model.

8. The method of claim 1 wherein repeatedly calculating relevancy scores for the plurality of available data storage system widgets based on expected needs of the user is performed using artificial intelligence techniques.

9. The method of claim 1 wherein the selected set of widgets displayed to the user on the display screen at a first time during operation of the data storage system management application is different than the selected set of widgets displayed to the user on the display screen at a second time during operation of the data storage system management application after the first time without the user instructing the data storage system management application to change the selected set of widgets.

10. The method of claim 1 wherein calculating relevancy scores for the plurality of available data storage system widgets based on expected needs of the user includes assigning relatively lower relevancy scores to widgets which have been previously dismissed by the user as irrelevant and relatively higher relevancy scores to widgets which have not been previously dismissed by the user as irrelevant.

11. The method of claim 1 wherein selecting the set of widgets having highest calculated relevancy scores from the plurality of available widgets includes choosing a number of widgets which can be simultaneously displayed on the display screen without the need for scrolling.

12. The method of claim 1 wherein repeatedly calculating relevancy scores for the plurality of available data storage system widgets based on expected needs of the user includes assigning relatively higher relevancy scores to widgets which are more relevant to a pre-assigned role model and relatively lower relevancy scores to widgets which are less relevant to the pre-assigned role model, the pre-assigned role model having been assigned to the user prior to the user operating the data storage system management application for a first time.

13. The method of claim 1 wherein:
the method further includes, during operation of the data storage system management application, dynamically:
    detecting patterns of activity performed by the user; and
    associating the user with a plurality of role models correlated with the detected patterns of activity in a weighted manner, each role model of the plurality of role models being assigned a respective weight, the plurality of role models being drawn from a pool of pre-established role models; and
calculating includes:
    for each role model of the plurality of role models, assigning relatively higher relevancy scores to widgets which are more relevant to that role model and relatively lower relevancy scores to widgets which are less relevant to that role model; and
    respectively weighting the assigned scores for the plurality of role models by the respective weights of each role model.

14. The method of claim 1 wherein the method further includes upon selecting a new set of widgets having highest calculated relevancy scores from the plurality of available widgets which differs from a previously-selected set of widgets having highest calculated relevancy scores from the plurality of available widgets, causing a particular widget within the new set, but not within the previously-selected set, to bear a visual signal of being new upon being displayed to the user on the display screen.

15. A computer program product comprising a non-transitory computer-readable storage medium storing instructions, which, when executed by a computing device, cause the computing device to automatically display a dynamic dashboard on a display screen by performing the following operations:
    during operation of a data storage system management application, repeatedly calculating, by the computing device, relevancy scores for a plurality of available data storage system widgets based on expected needs of a user;
    during operation of the data storage system management application, repeatedly selecting, by the computing device, a set of widgets having highest calculated relevancy scores from the plurality of available widgets; and
    during operation of the data storage system management application, repeatedly displaying the selected set of widgets to the user on a display screen, the displayed widgets each presenting data storage system management data to the user.

16. The computer program product of claim 15 wherein the instructions, when executed by the computing device, further cause the computing device to display a non-dynamic dashboard on the display screen at a point in time when the dynamic dashboard is not selected by the user, the non-dynamic dashboard having a fixed set of widgets pre-selected by the user.

17. The computer program product of claim 15 wherein:
the instructions, when executed by the computing device, further cause the computing device to, during operation of the data storage system management application, dynamically:
    detect patterns of activity performed by the user; and
    associate the user with a role model correlated with the detected patterns of activity; and
the instructions, when executed by the computing device to calculate relevancy scores, cause the computing device to assign relatively higher relevancy scores to widgets which are more relevant to the role model and relatively lower relevancy scores to widgets which are less relevant to the role model.

18. The computer program product of claim 17 wherein the instructions, when executed by the computing device to calculate relevancy scores, further cause the computing device to assign relatively higher relevancy scores to widgets which are configured to display data which currently is more relevant to the role model and relatively lower relevancy scores to widgets which are configured to display data which currently is less relevant to the role model.

19. The computer program product of claim 18 wherein the instructions, when executed by the computing device to assign relatively higher relevancy scores to widgets which are configured to display data which currently is more relevant to the role model, further cause the computing device to assign even higher relevancy scores to widgets which are configured to display data which currently is urgently relevant to the role model.

20. The computer program product of claim 17 wherein the instructions, when executed by the computing device, further cause the computing device to configure a selected widget of the selected set of widgets to display information which is of particular relevance to the role model without displaying data which is not of particular relevance to the role model.

21. An apparatus comprising:
   memory;
   a user interface connected to a display screen; and
   a controller, the controller being configured to automatically display a dynamic dashboard on the display screen by performing the following operations:
      during operation of a data storage system management application, repeatedly calculating relevancy scores for a plurality of available data storage system widgets based on expected needs of a user;
      during operation of the data storage system management application, repeatedly selecting a set of widgets having highest calculated relevancy scores from the plurality of available widgets; and
      during operation of the data storage system management application, repeatedly displaying the selected set of widgets to the user on a display screen via the user interface, the displayed widgets each presenting data storage system management data to the user.

* * * * *